United States Patent
Busi et al.

(10) Patent No.: US 7,480,292 B2
(45) Date of Patent: Jan. 20, 2009

(54) METHODS OF PROCESSING DATA PACKETS AT LAYER THREE LEVEL IN A TELECOMMUNICATION EQUIPMENT

(75) Inventors: Italo Busi, Cerro Maggiore (IT); Pietro Vittorio Grandi, Milan (IT); Michele Fontana, Verderio Superiore (IT); Giovanni Zangrando, Milan (IT)

(73) Assignee: ALCATEL, Paris (FR)

( * ) Notice: Subject to any disclaimer, the term of this patent is extended or adjusted under 35 U.S.C. 154(b) by 895 days.

(21) Appl. No.: 10/695,836

(22) Filed: Oct. 30, 2003

(65) Prior Publication Data
US 2004/0088430 A1    May 6, 2004

(51) Int. Cl.
*H04L 12/56* (2006.01)
(52) U.S. Cl. .............................. 370/389; 370/392
(58) Field of Classification Search ............ 370/389
See application file for complete search history.

(56) References Cited

U.S. PATENT DOCUMENTS

| | | | | |
|---|---|---|---|---|
| 5,566,170 A | * | 10/1996 | Bakke et al. | 370/392 |
| 6,339,595 B1 | | 1/2002 | Rekhter et al. | |
| 2002/0085567 A1 | * | 7/2002 | Ku et al. | 370/396 |
| 2003/0039245 A1 | * | 2/2003 | Khosravi et al. | 370/389 |
| 2003/0039246 A1 | * | 2/2003 | Guo et al. | 370/389 |
| 2004/0052257 A1 | * | 3/2004 | Abdo et al. | 370/392 |
| 2007/0220232 A1 | * | 9/2007 | Rhoades et al. | 712/20 |

OTHER PUBLICATIONS

E. Rosen et al, "Multiprotocol label switching architecture", RFC 3031, 'Online ! Jan. 2001, XP002241071.
F. Baker, "Requirements for IP version 4 routers", RFC 1812, 'Online! Jun. 1995 XP002241070.
A. Rodriguez et al, "TCP/IP tutorial and technical overview", IBM Redbooks, 'Online! Aug. 2001, pp. 90-100, 613-625, 806-815, XP00224172.
D. Black, "Differentiated services and tunnels" RFC 2983, "Online! Oct. 2000, XP002241073.
ITU-T G.806 dated Oct. 2000, Series G: Transmission Systems and Media, Digital Systems and Networks—Characteristics of Transport Equipment—Description Methodology and Generic Functionality.

* cited by examiner

*Primary Examiner*—Wing F Chan
*Assistant Examiner*—Anthony Sol
(74) *Attorney, Agent, or Firm*—Sughrue Mion, PLLC

(57) ABSTRACT

Method of processing MPLS packets in a telecommunication equipment comprising the following steps in the following order:
incoming direction:
  count received frames and octets,
  validate packets,
  determine interface identification,
  count received packets and octets,
  strip external header,
  lookup for destination of incoming packets,
  next layer decision and forwarding,
  TTL management,
  if next-hop is not the equipment, PHB determination;
outgoing direction:
  extract TTL from received outgoing client packets,
  forward received outgoing client packet as stripped MPLS packet with FEC, PHB, TTL,
  generate End_of_Stack bit,
  forward stripped MPLS packet with FEC, PHB, TTL, End_of_Stack
  lookup for destination of outgoing client packets with FEC originated by the equipment,
  TTL management
  create MPLS header,
  count transmitted packets and octets,
  forward MPLS packet, PHB, Next Hop.

11 Claims, 2 Drawing Sheets

METHODS OF PROCESSING DATA PACKETS AT LAYER THREE LEVEL IN A TELECOMMUNICATION EQUIPMENT

TECHNICAL FIELD

The present invention relates to methods of processing data packets at layer three level, particularly IP and MPLS packets, in a telecommunication equipment.

This application is based on, and claims the benefit of, European Patent Application No. 02292719.8 filed on Oct. 31, 2002 which is incorporated by reference herein.

BACKGROUND OF THE INVENTION

As it is well known, the standardization activity in the Internet world is quite peculiar and is carried out by the Internet Engineering Task Force (IETF) which is a large open international community of network designers, operators, vendors, and researchers.

The standardization activity of the IETF always involves and involved single operations of the processing of data packets and no attempt has ever been made to standardize a whole functional model for a telecommunication equipment.

There is an enormous number of possibilities to combine and implement the various operations; how and when the various operations are carried out highly affect the overall functionality of an equipment and its effectiveness.

SUMMARY OF THE INVENTION

It is an object of the invention to provide a method of processing IP packets. This object is achieved by a method of processing IP packets in a telecommunication equipment comprising the following steps in the following order:
in the incoming direction:
  IP packet validation,
  options field management,
  filtering,
  first next layer decision and forwarding;
in the outgoing direction:
  redirect management,
  TTL management,
  source address management,
  options field management,
  packet fragmentation.

This object is further achieved by a method which further comprises:
in the incoming direction, before the first IP packet validation step:
  MPLS packet input processing,
in the outgoing direction, after the lookup step:
  MPLS packet output processing.

The present invention proposes two particular choices that have revealed particularly effective in processing IP packets and/or MPLS packets in a telecommunication equipment.

The present invention relates also to a telecommunication equipment, to a computer program product and to a computer readable medium specifically adapted to implement these packet processing methods.

BRIEF DESCRIPTION OF THE DRAWINGS

The present invention will become apparent from the following description to be considered in conjunction with the accompanying drawings in which.

The description methodology used herein is the one defined in ITU-T (International Telecommunication Union, Telecommunication standardization sector) Recommendation G.806.

BEST MODE FOR CARRYING OUT THE INVENTION

The detailed description refers to a router that can deal with both IP packets and MPLS packets but the present invention has a broader application: it is applicable to a Host dealing with IP and/or MPLS packets as well as to a router dealing with IP and/or MPLS packets; additionally the present invention is independent from the number of physical interfaces of the equipment.

As it is well known, in a functional model of a telecommunication equipment transmission resources may be grouped into:
  connection functions,
  termination functions,
  adaptation functions,
  adaptation-termination functions.

According to the above mentioned recommendation, connection functions are graphically represented as a block with a shape of an ellipse, termination functions as a block with the shape of a triangle, adaptation functions as a block with the shape of a trapezium and adaptation-termination functions as a compound block having the shape of a triangle with a trapezium aligned on top.

Figure 1:
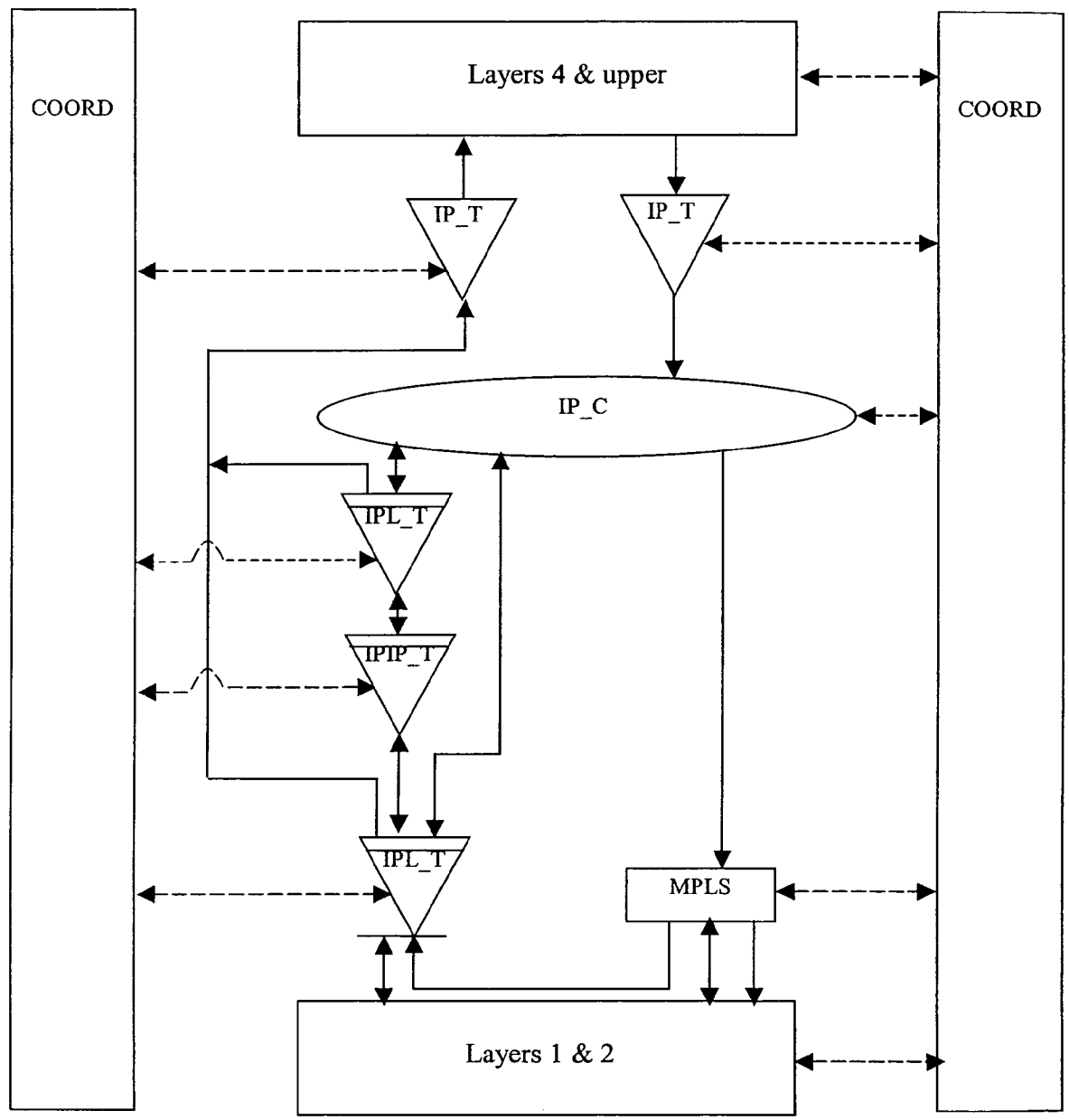
FIG. 1 shows a functional model of a whole telecommunication equipment according to the present invention, namely a router.

FIG. 1 shows a functional model of a router according to the present invention; both the receive and the transmit directions are represented. FIG. 1 is structured using an ISO/OSI logic.

The box named "Layers 4 and upper" contains all layer 4 protocols, signaling functions and IEMF (IP Element Management Functions) as well as upper layers applications. The box named "Layers 1 & 2" contains the hardware interfaces and layer 2 drivers.

While interpreting FIG. 1, keep in mind that the IP world layering is not completely in line with an ISO/OSI layering. So, as it is well known, layer 4 contains some functions that can be logically viewed as layer 3 functions. These functions are in layer 4 instead of layer 3 just because, for message transfer, they rely onto the IP protocol. In the same way you can find at layer 2 some functionality that is instead in layer 3. A typical example is the ARP (Address Resolution Protocol). This functionality should be placed at layer 3 from a message transfer point of view but, due to the fact that it provides the address translation feature needed to obtain the MAC (Medium Access Control) address, it is placed at layer 2.

A packet received from the network by the router is processed by the functional blocks from the physical layer up to an IP_C block, if it is forwarded, or up to the higher layers, if it is terminated. This processing is known as the processing in the incoming direction.

A packet, generated by the higher layers or forwarded, is processed by the functional blocks from IP_C block down to the physical layer, where it is transmitted to the network. This processing is known as the processing in the outgoing direction.

The coordination function (represented in FIG. 1 as two distinct boxes COORD only for graphical reasons) is the glue through which the direct communication with lower and upper layers is performed.

Every time a packet has to be discarded for any reason, the block that discards the packet has also to send to the ICMP (Internet Control Message Protocol), via the coordination function (COORD box), all the relevant information needed to assemble and send an ICMP message to the originator of the discarded packet. Any ICMP message is generated according to the standard IETF procedures.

The functionality for the incoming and outgoing direction are different and described in detail in the following.

In the Figures, continuous lines represent traffic flow, while dashed lines, usually connecting a termination or an adaptation block to the coordination function box, are used to represent a control flow.

An incoming packet is processed at first by layer 2 that understands whether the incoming packet is a pure IP packet or a MPLS encapsulated packet. MPLS encapsulated packets are managed in a MPLS box where they can be forwarded or terminated. Forwarded packets are sent back directly to layer 2 in case that they are still encapsulated and also in case that they are no longer encapsulated (penultimate pop case). The output interface is anyway chosen using the last popped label. Terminated packets are sent to IPL_T block for further processing.

The IPL_T termination functional blocks perform all the functions that must be applied to transit IP packets and also choose the next step that can be one of the following:
  the packet must be forwarded because it is not addressed to the router; in this case the packet is sent to an IP_C block for the lookup,
  the packet is encapsulated in an IP tunnel; in this case the packet is sent to an IPIP_T block for further processing,
  the packet is neither encapsulated into an IP tunnel nor to be forwarded; in this case the packet is directly sent to an IP_T termination block.

Tunneled packets are managed by the IPIP_T block that performs checks on all the terminated layer 3 headers and strip them. The packets are then sent to another IPL_T block.

It is important to understand that the two IPL_T termination blocks that are present in the tunnel processing line performs just the same operations, but on different layer 3 headers. The IPL_T termination block next to layer 2 manages the external header while the IPL_T termination block next to IP_C block manages the outer of the remaining headers after the strip operations performed by IPIP_T block.

IP_T termination block performs all the checks that must be performed on terminated packets and, if no problem is encountered, sends the packets to layer 4.

All the non-multicast packets generated by the router must pass first in IP_T block that adds the layer 3 header, then IP_C block performs the lookup and decides the output interface and the operations that must be performed before sending the packet.

The multicast packets generated by the router are associated with a specific output interface; in fact, these packets are actually control packets (for example OSPF packets) and not truly multicast packets. The upper layers should signal this specific output interface to IP_T block that adds the layer 3 header and passes the packet, together with the output interface signal, to IP_C block. Thus the connection function does not make any lookup but forwards the packets to the requested interface.

Three ways are possible in output:
  the packet is directly emitted,
  the packet must be encapsulated in an IP tunnel and then emitted,
  the packet must be encapsulated in MPLS and then emitted.

Transit packets are all the packets that are processed and forwarded by the router.

The processing is the same already described without considering the part from IP_T block to the upper layers.

Figure 2:
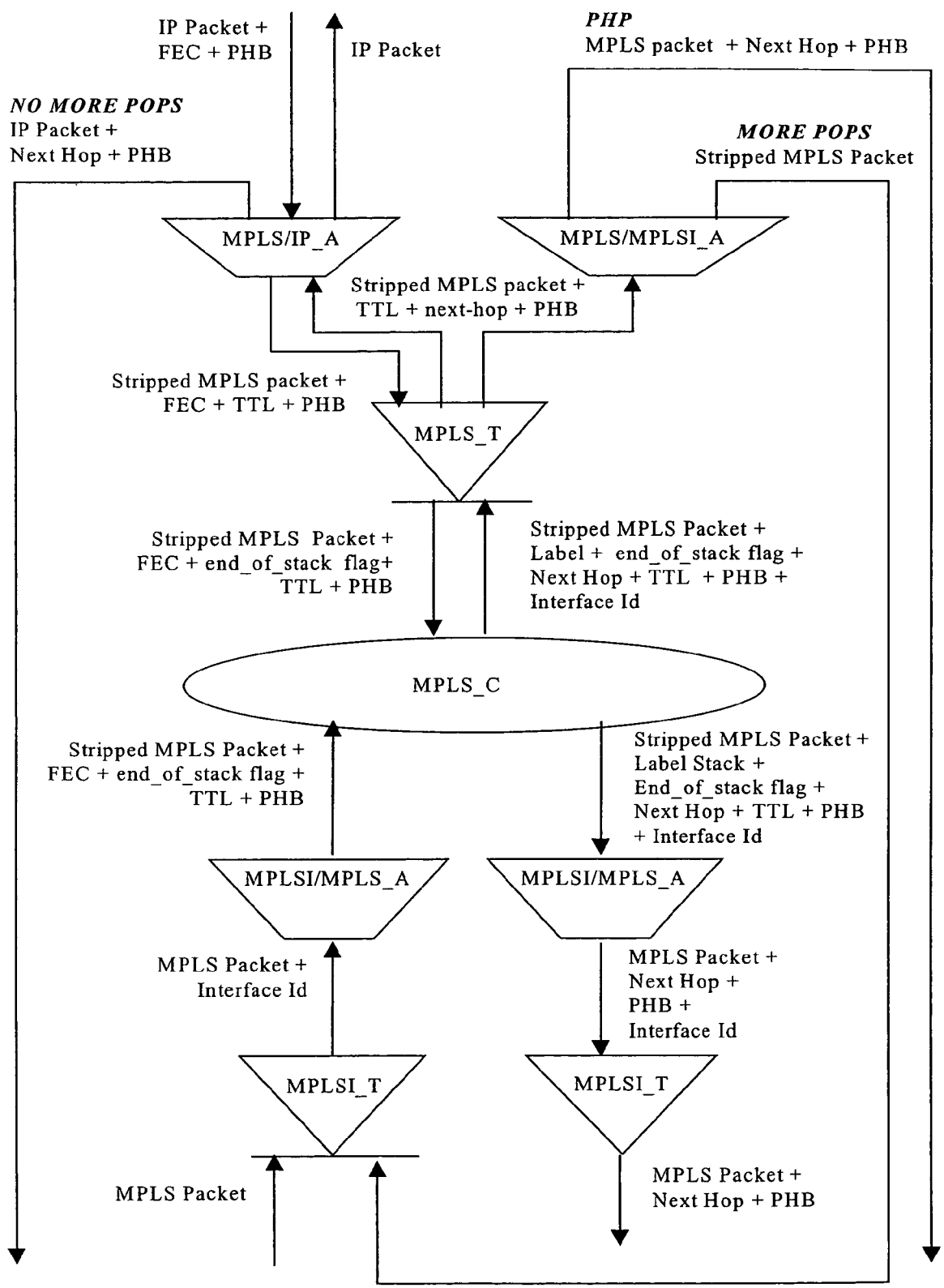
FIG. 2 shows the exploded functional model of box MPLS of FIG. 1.

The functional model of the MPLS box is detailed in FIG. 2.

In the upper side of the picture there is one entry point into MPLS box that carries the IP Packet, the PHB (Per-Hop Behavior) retrieved by IP_C block and the FEC (Forwarding Equivalent Class) calculated by IP_C block. The data are processed by an MPLS_T block that, in the outgoing direction toward an MPLS_C block, mainly builds a MPLS packet. The MPLS packet, together with PHB and FEC, is then forwarded to MPLS_C block for further processing.

In the lower side of the box there is an entry point for MPLS packets coming from the line. These packets are processed by an MPLSI_T termination block which validates them and by an MPLSI/MPLS_A block that strips the external MPLS header. The label (excluding PHB, TTL and End_of_stack flag) contained in the external header is sent to MPLS_C block together with the stripped packet and the interface identifier.

MPLS_C block performs different functions dependently from the origin of the packet. In case of packets coming from MPLSI_T block, a FEC lookup is performed in order to find the output interface and the labels to be pushed. The packet, together with labels, next hop and PHB, is then sent to MPLSI/MPLS_A block for encapsulation and queuing. In case of packets coming from MPLSI/MPLS_A block, a lookup is performed on the extracted label in order to understand if the MPLS packet must be terminated (and then sent to MPLS_T block) or routed (and then sent to MPLSI/MPLS_A block).

In the incoming direction, MPLS_T termination block decides, on the base of the next hop and the end-of-stack bit, whether to send the packet outside MPLS box to an IP/MPLS adaptation block (inside "Layers 1 & 2" box) for queuing ("No More Pops") or to send it back to MPLSI_T block ("More Pops") in order to perform a new pop operation. This last case is aimed at taking into account the possibility to have multiple pops in the same termination (that is: multiple tunnel termination) and also the possibility that the penultimate node in the LSP (Label Switched path) performs a pop that should be made by the last node (penultimate pop functionality).

MPLS_C block is in charge of making the lookup for both all the received MPLS labeled messages and for all the received IP packets originated by the router.

MPLS_C block is in charge of supporting the following roles:
  MPLS Core Router processing incoming MPLS labeled packets;
  MPLS Edge Router processing incoming unlabeled IP packets and forwarding outgoing MPLS packets;
  MPLS TLS Edge Router processing incoming unlabeled Ethernet frames and forwarding outgoing MPLS packets.

FEC parameter is provided as input to a lookup process, where FEC consists of:
  1. <incoming interface ID, input MPLS label> for received MPLS packet,
  2. <IP FEC (as pointer to NHLFE)> for generated IP packets,
  3. <flow ID> for any other protocols (e.g. TLS).

In case of unlabeled packet, it maps the FEC determined by IP_C block to one or more NHLFE (Next Hop Label Forwarding Entry). In this case, the process is called FTN (FEC-to-NHLFE).

In case of labeled packet, it maps the incoming label to one or more NHLFE. In this case the process is called ILM (Incoming Label Map).

NHLFE, FTN, and ILM tables are defined as follows.

The NHLFE is used when forwarding a labeled packet.

Note that at a given LSR (Label Switch Router), the packet's "next hop" might be that LSR itself. In this case, the LSR would need to pop the top level label, and then "forward" the resulting packet to itself. It would then make another forwarding decision, based on what remains after the label stacked is popped. This may still be a labeled packet, or it may be the native IP packet. This implies that in some cases the LSR may need to operate on the IP header in order to forward the packet. If the packet's "next hop" is the current LSR, then the label stack operation must be to "pop the stack".

The ILM maps each incoming label to a set of NHLFEs. It is used when forwarding packets that arrive as labeled packets.

This block can use, in order to map an incoming label to a set of NHLFEs, in addition to the incoming label, other information such as the Interface Identifier (retrieved by MPLS_T block). This last information is needed in case of management of multiple label address spaces. In some cases it could be desirable to associate different labels to the same FEC across different interfaces.

If the ILM maps a particular label to a set of NHLFEs that contains more than one element, exactly one element of the set must be chosen before the packet is forwarded.

The fact that the ILM maps a label to a set containing more than one NHLFE may be useful if, e.g., it is desired to do load balancing over multiple equal-cost paths.

The FTN maps each FEC to a set of NHLFEs. It is used when forwarding packets that arrive unlabeled, but which are to be labeled before being forwarded.

If the FTN maps a particular label to a set of NHLFEs that contains more than one element, exactly one element of the set must be chosen before the packet is forwarded. The fact that the FTN maps a label to a set containing more than one NHLFE may be useful if, e.g., it is desired to do load balancing over multiple equal-cost paths.

After making the lookup MPLS_C block decides the way to follow; there are only two possibilities:
  the packet must be forwarded after pushing one or more labels; in this case the packet is sent to MPLSI/MPLS_A block together with Interface ID, labels information, End_of_stack flag, next hop, TTL and PHB,
  the packet must be terminated locally either because some multiple pop must be performed or because the packet destination is the router itself; MPLS_C block is not able to distinguish between these last two cases and sends anyway the packet to MPLS_T block for further processing.

Note that no processing is performed on the TTL whose value is only copied from input to output, so that next blocks can perform further processing.

The aim of MPLSI_T block is to deal with the operations linked to the termination of a MPLS packet.

In FIG. 2 the block is represented as two separated boxes for completeness of both the possible receive and transmit processing: processing after receiving a MPLS packet from the line, processing linked to multiple pop and processing linked to transmission.

In the incoming direction it performs the following operations:
1. counts received frames and number of octets,
2. validates incoming MPLS packet against label range,
3. determines the interface identification (Interface ID), In the outgoing direction it performs the following operations:
1. performs MPLS fragmentation,
2. passes on switched MPLS packet, PHB and Next Hop; no operation is made using PHB and Next hop in this block; these pieces of information are only forwarded to other blocks for queuing.

The MPLSI_T block is represented as an MPLS interface and it is created/deleted from Agent at activation/deactivation of the underlying physical (PPP, Ethernet) interface but supporting MPLS.

At creation time the following parameters related to the interface will have a predefined or fixed value:
  The interface speed is 0
  The interface high speed is 0.
  The interface physical address is not used
  The interface connector is set to false.
  Counters are reset to 0
  The duplex type is fixed to Full Duplex.
  The promiscuous mode is set to False
  The interface alias is empty. The manager can change it at its ease.
  The interface name and description contain a zero-length string The MPLSI_T can be activated only if the underlying interface (PPP or Ethernet) has been activated.

The MPLSI_T can only be deactivated if no MPLS segments (either in the incoming or in the outgoing direction) are activated above it.

The operational state represents the actual or operational status of MPLS on this interface.

The network management system can, at any time, retrieve the current operational state of the MPLSI_T.

Changes of operational state must be spontaneously notified to the manager via state change notification.

The time of the last operational state change must be stored.

The manager can read the time of the last operational state change.

Each received packet is checked to have a label belonging the configured MPLS incoming range. Packets received with an out-of-range or a not-allocated MPLS label are discarded.

Processing of received packets with reserved labels (between 0 and 16) is for further study.

The following monitoring parameter is updated from MPLSI_T block (in PM Domain).
  Interface Failed Label Lookup: it represents the number of labeled packets that have been received on this interface and were discarded because there was no matching cross-connect entry.

Per-interface MPLS label space provisioning requires NMS to specify for each MPLS interface the following parameters:
  Interface Label Minimum Incoming
  Interface Label Maximum Incoming No provisioning is required for outgoing Per-interface MPLS label space (Interface Label Minimum Outgoing, Interface Label Maximum Outgoing) and any MPLS label on output interface as provided from down-stream MPLS Label Distribution Process is accepted by the equipment.

The MPLSI_T block retrieves the following Monitoring parameters:
Interface Incoming Labels Used: it represents the number of labels that are in use at this point in time on this interface in the incoming direction
Interface Outgoing Labels Used: the same of Interface Incoming Labels Used for the outgoing interface.

The following parameters per each interface can be configured:
Interface Total Bandwidth
Interface Available Bandwidth.

MPLS packets exceeding MTU of any MPLS interface are discarded.

The following monitoring parameter is updated by MPLSI_T block:
Interface Outgoing Fragments: it represents the number of outgoing MPLS packets that required fragmentation before transmission on this interface.

The aim of MPLSI/MPLS_A block is to deal with the operations linked to the reception and transmission of a MPLS packet.

In FIG. 2 are represented both the receive and transmit processing.

In the incoming direction it performs the following operations:
1. count of received packets and number of octets,
2. strip of the external MPLS header retrieving the stripped information.

In the outgoing direction it performs the following operations:
1. TTL management (decrement and checks),
2. creation of a new MPLS header (MPLS Label Push); EXP bits are set according to the PHB,
3. count of transmitted packets and number of octets.

The MPLSI/MPLS_A block is created/deleted through an explicit NMS request. Creation and deletion of MPLSI/MPLS_A function block is performed in unidirectional way.

The MPLSI/MPLS_A activation/deactivation is performed in unidirectional way through an explicit NMS request.

The MPLSI/MPLS_A can be activated only if the underlying MPLSI_T block has been activated. It can be deactivated only if the corresponding MPLS cross-connection has been deactivated.

A router must not check the TTL of a packet except when forwarding it; more specifically, any MPLS packet addressed to the equipment and with TTL equal to 0 must be considered a valid packet.

In the outgoing direction, if the TTL of the forwarded packets is greater then 1 it is decreased by 1 else the packet is discarded.

The MPLSI/MPLS_A block provides for each direction a set of primitives for monitoring purposes. They are:
for the incoming direction:
Incoming Segment Octets: it represents the total number of octets received by this segment
Incoming Segment Packets: it represents the total number of packets received by this segment
Incoming Segment Errors: it represents the number of errored packets received on this segment
Incoming Segment Discards: it represents the number of labeled packets received on this in-segment, which were chosen to be discarded even though no errors had been detected to prevent their being transmitted; one possible reason for discarding such a labeled packet could be to free up buffer space
Incoming Segment HC Octets: it represents the total number of octets received; this is the 64 bit version of Incoming Segment Octets
Discontinuity Time: it represents the value of sysUpTime on the most recent occasion at which any one or more of the above counters suffered a discontinuity;
for the outgoing direction (with the same meaning of the above counters, but applied to outgoing direction):
Outgoing Segment Octets
Outgoing Segment Packets
Outgoing Segment Errors
Outgoing Segment Discards
Outgoing Segment HC Octets
Discontinuity Time The aim of MPLS_T block is to deal with the operations linked to the termination of a MPLS packet and to the decision of further processing steps relying on both the End_of_stack flag and MPLS label retrieved before the pop operation. In the incoming direction it performs the following operations:
1. pass incoming MPLS packet to different Adaptation blocks for further processing.

MPLS packet is passed to MPLS/MPLSI_A adaptation function if the End_of_stack flag is equal to 0.

If the End_of_stack flag is equal to 1, MPLS packet is passed to more specific adaptation functions (MPLS/IP_A, MPLS/TLS_A). Possible criteria are:
Interface ID and incoming MPLS Label associated with IP or TLS services.

In the outgoing direction it performs the following operations:
1. pass on received stripped MPLS packet, FEC, TTL and PHB. It generates the End_of_stack bit (set to 1).

In incoming direction the MPLS/MPLSI_A adaptation block performs the following operations:
1. TTL Management: decrement and check of the TTL value when the next-hop is not the LSR itself; the TTL value is then copied into the inner MPLS header,
2. if next-hop is not LSR itself, it performs PHB determination (PHP with remaining MPLS labels),
3. decide further steps.

If Next Hop is LSR itself, it passes MPLS packet to MPLSI_T for subsequent lookups (POP operations with remaining MPLS labels).

Otherwise it passes MPLS packet with calculated PHB to Layer 2 corresponding to Next-Hop (PHP with remaining MPLS labels).

In incoming direction the MPLS/IP_A adaptation block performs the following operations:
1. TTL Management: Decrement and check of the TTL value when the next-hop is not the LSR itself; the TTL value is then copied into the IP header,
2. if next-hop is not LSR itself, it performs PHB determination (PHP without remaining MPLS labels),
3. decide further steps.

If Next Hop is LSR itself, it passes IP packet to IPL_T for IP forwarding (POP operation without remaining MPLS labels).

Otherwise it passes the IP packet with calculated PHB to Layer 2 corresponding to Next-Hop (PHP without remaining MPLS labels).

In outgoing direction the MPLS/IP_A adaptation block performs the following operations:
1. it extracts the TTL from the IP packet,
2. it passes on the received IP packet as a stripped MPLS packet together with the received FEC, PHB and the extracted TTL to the MPLS_T block.

In the following paragraphs you can find a detailed overview of layer 3 functionality associated to the IP protocol to be considered in conjunction with FIG. 1.

In the incoming direction IPL_T block has the following functionality:
1. IP packet validation
2. options field management
3. filtering
4. next layer decision and forwarding.

In the outgoing direction IPL_T block has the following functionality:
1. redirect management
2. TTL management
3. source address management
4. option field management
5. packet fragmentation It has to be remembered that IP packet header checksum calculation must be performed by all the processes that change the header.

Before making any processing of the IP header some checks ("incoming IP packet validation") must be performed. If any of the checks is not passed successfully, the packet is sent, together with the reason of the failure, to the ICMP process using the coordination function. The checks are reported below in execution order:
1. the packet length reported by the link layer must be large enough to hold the minimum legal IP,
2. the IP header checksum must be correct,
3. the IP version number must be 4,
4. the IP header length field must be large enough to hold the minimum length legal IP header; that is it must be larger then or equal to 5 (20 bytes header),
5. the IP total length must be larger then or equal to the IP header length,
6. the packet length reported by the link layer is larger then or equal to the IP total length,
7. the strict source route option must not be present if the IP destination address does not belong to router,
8. if the IP source address is invalid, the packet is silently discarded; an IP source address is considered invalid if it is in network 0, if it is a multicast or broadcast address or if it is a loopback address,
9. other option specific checks,
10. if the IP destination address is invalid the packet is discarded; an IP destination address is considered invalid if it is in network 0, it is of class E, or it is a loopback address; this check must be performed only after a destination address switch due to loose source route or strict source route has been performed.

In the TOS and Flags fields there are two bits reserved for future use. These bits must not be involved in any kind of check.

When a multicast packet is received the following checks must also be performed:
1. The interface should belong to the multicast group identified by the destination address; all the interfaces of the router always belong to the "all IP hosts" permanent group. The dynamic group membership is managed by an IGMP (Internet Group Management Protocol) block and signaled to IPL_T block through the coordination function; all the received multicast packets that have been sent to a multicast group to which the interface does not belong are silently discarded (including the ones which any other interface of the router belongs to),
2. the router should not be the source of the received multicast racket; if the source address of the received packet is one of the router's addresses, the packet is silently discarded; if an application would require to receive that packet, it would have been looped back by IP_T block.

The IP version 4 protocol foresees the possibility to insert in the header different options.

The order in which the options are inserted in the header is free.

There are two possible option formats:
a single byte option containing the option type only
a multiple byte option containing, in order: option type, option length and data.

The option type can be viewed as a bit field with the following meaning:
the most significant bit specifies whether or not the option must be copied in fragments when the fragmentation function is supported (options whose type is greater then 127 must be copied in fragments),
the less significant 5 bits specify the option number,
the remaining 2 bits contain the option class, that has value 2 for the timestamp option and 0 for all the other options.

The IP layer must interpret all the options that it understands and preserve unaltered all the other options ("options field management"). In the following there is a short explanation of all the options together with information about router processing and support in IPL_T termination block.

The End_of_Option_List option is used at the end of all options when the end of the options does not coincide with the end of the header.

The No_Operation option is used to align the beginning of an option to a 32-bit boundary.

The Security option is used to send security information, compartment information, handling restriction information.

The Loose_Source_rout option provides a mean for the source of an IP packet to supply explicit routing information to be used by the routers in forwarding the packet to destination and record the followed route.

The loose source route option is used when it is needed to force a packet to traverse only some specific nodes in a path.

The four fields present in the option are:
type: (the option type) the value for loose source route option is 131,
length: it is the length of the option considering type, length, pointer and route data fields,
pointer: it is the displacement of the next address to be processed, starting from the beginning of the option; the minimum value is 4; if the pointer is greater then length, then the end of the option is reached and further routing is made using the destination IP only,
route data: a sequence of addresses to be processed.

Every time the router receives an IP packet whose destination is the router itself, it must check if the loose source route option is present.

If the option is present and it is not empty (pointer is less then length) the following operations must be performed in the incoming direction:
check if it is the only source route option (either strict or loose) in the IP header; if there are two or more source route option the packet is discarded and sent to the ICMP block for error reporting,
take the next IP address in the data field and put it in the destination address field of the packet.

If this option is present, it is not empty (pointer is less then length) and the pointed value is equal to the destination address, then the following operations must be performed in the outgoing direction:
put the IP address of the output interface at the location pointed by the pointer
increment the pointer by 4.

This procedure ensures that the return route is recorded in reverse order into the option, so that the final recipient can use these data to construct a loose source route in the reverse direction.

Due to the fact that the destination address is replaced, any check involving destination address validity must be performed after the address replacement.

The Strict_Source_Route option provides a mean for the source of an IP packet to supply explicit routing information to be used by the routers in forwarding the packet to destination and record the followed route.

The strict source route option is used when it is needed to force a packet to traverse a specific path. All the nodes in the path must be present in the option.

The format of the option is the same as the loose source route option and is described previously.

The value assigned to the option type is 137.

Every time the router receives an IP packet whose destination is the router itself, it must check if the strict source route option is present.

If the option is present and it is not empty (pointer is less then length) the following operations must be performed in the incoming direction:
  check if it is the only source route option (either strict or loose) in the IP header; if there are two or more source route option the packet is discarded and sent to the ICMP block for error reporting,
  take the next IP address in the data field and put it in the destination address field of the packet.

If this option is present, it is not empty (pointer is less then length) and the pointed value is equal to the destination address, then the following operations must be performed in the outgoing direction:
  put the IP address of the output interface at the location pointed by the pointer,
  increment the pointer by 4.

This procedure ensures that the return route is recorded in reverse order into the option, so that the final recipient can use these data to construct a loose source route in the reverse direction.

Due to the fact that the destination address is replaced, any check involving destination address validity must be performed after the address replacement.

The Record_Route option provides a mean for the source of an IP packet record the route followed by a packet from source to destination.

The format of the option is the same as the loose source route option and is described previously.

The value assigned to the option type is 7.

Every time the router receives an IP packet whose destination is not the router itself, it must check if the record route option is present.

If the option is present and there is some free space (pointer is less then length) the router must perform the following checks in receive direction:
  this option appears at most once in a racket,
  there is enough free space in the option to accommodate an IP address.
  If the check fails the packet is discarded.

If this option is present and there is free space (pointer is less then length) the following operations must be performed in the incoming direction:
  put the IP address of the output interface at the location pointed by the pointer,
  increment the pointer by 4.

If this option is present and no space is available (pointer is greater then length) no operation must be performed.

The Stream_ID option is used to transport a SATNET stream through a network that does not support the stream concept.

This option is obsolete.

The Timestamp option is used to force some or all the nodes in an IP network to insert a timestamp on a routed packet.

The Router_Alert option is used in order to communicate to a router that it has to further examine a packet that is not directly addressed to it.

A possible usage for this option is smooth introduction of new routing capabilities without having to reinvent the basic routing protocol functions.

The three fields present in the option are:
  type: (the option type) the value for router alert option is 148,
  length: it is the length of the option considering type, length, pointer and route data fields; the value is fixed to 4,
  value: it is set to 0 if the router has to examine the packet. All other values are reserved for future use.

In the outgoing direction, the "redirect management" functionality provides that it is checked if the packet that is going to be sent satisfy the following conditions:
  it has been received from the same interface over which it is going out,
  the source address belongs to the sub-network of the next-hop,
  there is no a source route option.

If all the previous conditions are true, the packet is anyway sent. A copy of it is also sent to the ICMP block, together with the next-hop address, for the generation of the reroute ICMP message.

A router must not check the TTL of a packet except when forwarding it "TTL management"); more specifically, any IP packet addressed to the router and with TTL equal to 0 must be considered a valid packet.

In the outgoing direction, if the TTL of the forwarded packets greater then 1 it is decreased by 1 else the packet is discarded.

Every time that the IP header is changed by IPL_T block, the checksum must be recalculated ("checksum calculation").

The router supports the incremental checksum calculation, i.e. the new checksum is calculated starting from the one present in the IP header, taking into account only the performed changes.

This practice ensures that packets trashed by the router are discarded by the next hop.

After completing the processing of an incoming packet, IPL_T block decides which is the next layer that has to receive the packet for further processing, using the protocol field and the destination address field; the next layer can be considered a sub-layer of ISO/OSI layer 3.

If the destination address is a multicast address, the packet must be terminated and then it is forwarded to IP_T block. The interface is also passed through the "Mcast If" signal.

If the protocol field is IP v4 and the destination address is one of the router interfaces IP addresses or the router-id, then an IP in IP tunnel is terminated; the packet is forwarded to the IPIP_T termination.

If the destination address is not one of the router interfaces IP addresses, then the packet must be rerouted; the packet is forwarded to IP_C connection function block.

If the destination address is one of the router interfaces IP addresses or the router-id and the protocol is different from IP v4, then the packet must be terminated; the packet is forwarded to IP_T termination block.

When a packet to be routed has a size greater then the MTU (Maximum Transmission Unit), the packet must be fragmented ("packet fragmentation").

Every fragment (IP header included) must have a size that is less then or equal to the MTU.

When fragmenting, all the header fields must be copied into all the fragments with the exception of the checksum that must be recalculated and of the options, whose behavior can be understood looking at the option type field. In this way all the fragments of the same packet will have the same value in internet identification field.

All the fragments but the last have the more fragments flag bit set to 1.

The fragment offset field identifies the fragment location (in 8 bytes units) relative to the beginning of the original unfragmented packet. The first fragment has offset equal to 0.

Due to the fact that the minimum offset is 8 bytes, and the header can be up to 60 bytes, no packet that is less than 68 bytes is fragmented.

In the TOS and Flags fields there are two bits reserved for future use. These bits must be copied in all the fragments.

Any interface of the router must have associated an IP address that can be provided by the manager when the interface is not active.

The provisioned IP address must be valid, otherwise the provisioning is rejected by the router.

The IP address is formed by two parts:
- a 32 bit IP address that identifies the element within a network,
- a 32-bit net-mask that specifies which bits identify the sub-network and which bits identify the element within the sub-network; the bits that identify the sub-network must be the most significant bits and must be consecutive.

If a point to point interface has no associated IP address and a router ID is configured as part of the routing protocol configuration, then the router ID must be used as interface address.

When an IP interface is deleted, all the IP addresses associated to that interface must be deleted.

The task of IPIP_T termination block is to give all the support needed during the set up and management phases of the IP over IP tunnel.

The source termination has as first task to determine which tunnels must be created onto an incoming IP Packet looking at the information kept in local tables. The following step is to create and properly fill a layer 3 header for each tunnel that must be created.

If the IP packet has to be inserted in no tunnel, then the source is absolutely transparent and the incoming packet is passed on without any processing.

The tunnel termination block must perform the following processes in outgoing direction:
1. determine which tunnels must be created (if any),
2. validate IP address of the incoming packet versus tunnel addresses,
3. make address translation from client receiver to tunnel endpoint address and vice versa,
4. insertion of external header,
5. process the external header fields forcing the fragmentation flag to "Do Not Fragment" value,
6. process the external header options fields,
7. calculate the external header checksum,
8. make path MTU discovery,
9. in case of errors occurred in transmission send ICMP messages to the originator of the messages being routed in the tunnel.

Traceroute functionality may also be implemented.

The Labels and CoS information, when present, is only passed on, in order to allow further blocks to make MPLS encapsulation.

The sink termination block has, as first task, to determine which tunnels must be terminated. This operation can be performed looking at the Protocol Field and destination address of each stacked layer 3 header. The immediately following step is to strip all the external headers and manage the TTL of the inner header. If no tunnel at all must be terminated, then the sink is absolutely transparent and the incoming packet is passed on without any processing.

The tunnel termination block must perform the following processes in the incoming direction:
1. determine which headers must be stripped (if any),
2. strip the tunnel headers,
3. process the TTL of all the stripped headers with the exception of the first one already processed by IPL_T block,
4. process the CRC of all the stripped headers with the exception of the first one already processed by IPL_T block.

The main task of the IP_C block is to perform a lookup in order to decide the destination of every incoming and outgoing IP packet.

This block performs, from a logical point of view, two kinds of lookup.

The first kind is a lookup to the forwarding tables in order to understand if an IP packet must be routed or terminated. In the first case IP_C block determines the next hop and the interface that will send out the packet.

If the packet has a multicast address, it is forwarded to the interface that is required by the upper layer protocol, that has generated the packet, via the "Mcast If" signal.

The second kind of lookup is linked to the fact that it is possible to originate an MPLS packet and it is used for FEC calculation.

In this case IP_C block has to perform the following operations:
determine the FEC of the outgoing IP packet,
determine the CoS.

This look up leads to a classification of the incoming packets in terms of FEC. To perform this classification also the incoming Interface Id must be taken into consideration.

A FEC is a group of IP packets which are forwarded in the same manner (e.g. over the same path, with the same forwarding treatment).

In particular, an incoming IP packet belongs to a FEC if it satisfies one or more of the following criteria, which can be activated singularly per each incoming interface:
source address,
destination address,
source Port,
destination Port,
protocol.

An incoming packet can be matched against more that one set of criteria to determine its FEC.

For example an incoming packet could be matched first against a certain Source Address and Destination Address (FEC 1) and then against a certain Destination Address (FEC 2).

Once the packet is classified, it is passed to MPLS_T block for further operations.

In the incoming direction IP_T block performs the following functions:
1. IP packet header validation,
2. packet reassembly,
3. options field management,
4. next layer decision and forwarding.

In the outgoing direction IP_T block performs the following functions:
1. multiplexing of IP payloads,
2. options field management,
3. generation of the IP header.

Before making any processing on the IP header some checks must be performed ("incoming IP packet validation"). If any of the checks is not passed successfully, the packet is forwarded, together with the reason of the failure, to ICMP for further processing. The checks are reported below in execution order:
1. the IP source address is different from 0.0.0.0; packets that do not pass successfully this check are silently discarded,
2. the protocol field of the IP header specifies a supported protocol.

The supported protocols are described in the following table:

| Protocol | Decimal Value |
| --- | --- |
| ICMP | 01 |
| IGMP | 02 |
| IP (IP in IP) | 04 |
| TCP | 06 |
| UDP | 17 |
| RSVP | 46 |
| OSPF | 89 |

Incoming fragmented packets must be reassembled ("packet reassembly"). The fragments that are part of the packet must be kept in a queue until all the fragments are received or the re-assembly time is expired. If the re-assembly time expires before all the fragments are received, all the fragments already received must be discarded.

The value of the re-assembly time is product specific and can be read by the manager at any time.

The IP version 4 protocol foresees a number of options.

The IP layer must interpret all the options that it understands ("options field management"). In the following there is a short explanation of all options together with information about router processing and support in IP_T termination block.

The End_of_Option_List option is used at the end of all options when the end of the options does not coincide with the end of the header, that is when padding is used.

The No_Operation option is used to align the beginning of an option to a 32-bit boundary.

The Security option is used to send security information, compartment information, handling restriction information.

The Loose_Source_Route option provides a mean for the source of an IP packet to supply explicit routing information to be used by the routers in forwarding the packet to destination and record the followed route.

The loose source route option is used when it is needed to force a packet to traverse only some specific nodes in a path.

If a source routed packet is terminated in IP_T termination block, the recorded route must be passed to the upper layers. When a loose source route packet is originated, the option must be always well formed. This means that the destination address of the IP packet must be the IP address of the first router, while the option contains the IP address of the other routers. No multicast address can appear in this option list.

The Strict_Source_Route option provides a mean for the source of an IP packet to supply explicit routing information to be used by the routers in forwarding the packet to destination and record the followed route.

The strict source route option is used when it is needed to force a packet to traverse a specific path. All the nodes in the path must be present in the option.

The format of the option is the same as the loose source route option and is described above.

If a source-routed packet is terminated in IP_T termination block, the recorded route must be passed to the upper layers.

When a strict source route packet is originated, the option must be always well formed. This means that the destination address of the IP packet must be the IP address of the first router, while the option contains the IP address of the other routers. No multicast address can appear in this option list.

The Record_Route option provides a mean for the source of an IP packet record the route followed by a packet from source to destination.

The format of the option is the same as the loose source route option and is described above.

When this option is originated, the router has the responsibility to allocate enough space to allow the registration of the complete path.

The size of the option data part (where the addresses are stored) must be a multiple of the IP address size.

If a record routed packet is terminated in IP_T termination block, the recorded route must be passed to the upper layers.

The Stream_ID option is used to transport a SATNET stream through a network that does not support the stream concept.

This option is obsolete.

If it is present in the terminated IP packet it must be ignored.

This option is never generated by the IP_T termination block.

The Timestamp option is used to force some or all the nodes in an IP network to insert a timestamp on a routed packet.

The Router_Alert option is used in order to communicate to a router that it has to further examine a packet that is not directly addressed to it.

A possible usage for this option is smooth introduction of new routing capabilities without having to reinvent the basic routing protocol functions.

This option must be ignored in IP termination block.

IP_T termination block has to strip the header and forward the payload to the upper layer clients (e.g. TCP, UDP, IGMP, . . . ) using the protocol as selector ("next layer forwarding").

The upper layer client protocol is specified in the protocol field of the IP Header. If the protocol is unknown or not active, the packet is discarded and passed, together with the reason of the failure, to the ICMP client via the coordination function.

Together with the payload, IP_T termination block must pass to the upper layers:
- the destination addresses of the packet,
- the strict source route information (if present),
- the loose source route information (if present),
- the record route information (if present),
- the timestamp information (if present),
- the TTL (if known),
- the interface over which the packet has been received (if it is a multicast packet).

IP_T termination block has to multiplex payloads coming from different upper layer protocols ("multiplexing of IP payloads").

Together with the payload, the upper layer protocols must pass to IP_T termination block:
- the protocol type,
- the source and destination addresses of the racket; the source address must be an unicast IP address, different from 0.0.0.0 and assigned to any interface of the router or been the router ID,
- the strict source route information (if present),
- the loose source route information (if present),
- the record route information (if present),
- the timestamp information (if present),
- the TTL,
- the ToS,
- the Identifier of the packet,
- the interface over which the packet should be sent and wether it could be looped back or not (if it is a multicast packet).

When generating the IP header the following actions must be performed:
- set the IP version number field of the header to the value 4,
- set the type of service field using the data received from the upper layer protocols,
- set the TTL value using the data received from the upper layer protocols; if the upper layer protocol does not provide a TTL value, a default value is used; the default value, for unicast packets, can be provisioned by the manager; after the first startup, the default value for TTL is 255; the default value, for multicast packets, is always 1.
- set the protocol field, source and destination addresses using the data received from the upper layer protocols,
- set the identification field with a value that is unique for the source address/destination address couple; the value is the one received by the upper layers; this value can be useful for nodes that are able to make fragmentation,
- set the flags field with value 0 with the exception of the "Don't Fragment" flag that is set with the value received by the upper layer protocols,
- set the fragment offset to 0,
- originate the option fields,
- generate padding,
- calculate the header length and write it in the appropriate field,
- add the payload,
- calculate the total length and write it in the appropriate field,
- calculate the checksum according to the general algorithm.

In case of multicast packets, the upper layer that had generated it can require, through the Mcast Loopback signal, to inhibit the local delivery of the datagram even if the router is member of the group to which the packet is sent to.

The IP multicast packet is sent to IP_C block for network delivery, together with the interface over which the packet should be sent (i.e. the Mcast signal) and, if the upper layer does not inhibit the local delivery, also to the upper layer for local delivery by this function. Any multicast IP packet generated by the router that are received by the network are discarded by the next layer forwarding process.

The interface over which the multicast packet should be sent may be omitted by the upper layer application. In this case, IP_T block should pass to IP_C block a default interface, that is provisioned by the TMN (Telecommunication Management Network).

In this particular embodiment, applications always signal the output interface for each multicast packet, so the previous feature is not required.

The ICMP (Internet Control Message Protocol) is used to allow the router to communicate with the source of a packet processed by the router itself, e.g. because some errors occurred during the processing of this packet. It is always present and active.

There are three kinds of ICMP messages:
- error reporting ICMP messages,
- request ICMP messages,
- reply ICMP messages An error reporting ICMP message is generated by any host or intermediate router when an errored IP packet is processed.

The following paragraphs can be better understood if reference is made to FIG. 1.

All the errored packets are reported to an ICMP block (not shown in the Figures) by the atomic function that detects the error condition through the coordination function. The ICMP block than generates, if it is the case, the proper error reporting ICMP message. All the generated ICMP error messages will carry the IP header and as much as possible payload octets (i.e. without causing the dimension of the IP packet, carrying the ICMP message, exceeding 576 bytes) of the errored packet.

In order to avoid infinite messages, no error reporting ICMP messages are generated when:
- the errored packet is carrying an ICMP message,
- the destination address of the errored packet is a broadcast or a multicast address,
- the errored packet is a fragment different from the first one.

In order to limit the generation rate of the ICMP error messages, the router can avoid generating some ICMP error messages even if the corresponding error conditions are detected. The mechanism used to chose which message not to generate is product specific.

The error reporting ICMP messages can be received by the ICMP block only in response to IP packets generated by the router. These messages are then passed to the higher layer protocol (i.e. the TCP or UDP) that has generated the errored packet, through the coordination function.

Any higher layer protocol (e.g. TCP or UDP) can request the ICMP block to send some request ICMP messages through the coordination function. The request ICMP message is then generated.

The reply ICMP messages are generated by the ICMP block in response to a received request ICMP message.

The reply ICMP messages can be received by the ICMP block only in response to request ICMP messages it has generated. These messages are then passed to the higher layer protocol that has made the request.

All the ICMP messages addressed to the router are received by the ICMP block through IP_T block. A received ICMP message is considered invalid and then discarded, without being processed, if one of the following condition is satisfied:
- the checksum is not correct,
- the length is invalid.

All the ICMP messages that are generated by the ICMP block are transmitted as normal IP packets generated by the router, passing through IP_T block. These messages are never discarded in the ICMP layer, but may be discarded only in the lower layers. The ICMP block will also signal the additional information to IP_T block.

The source address of an error reporting message is the IP address of the interface that has detected the error condition. The source address of the reply message is the destination address of the corresponding request. The source address of a request message is signaled by the upper layer to the ICMP block, or the router ID is used.

The destination address of an error reporting message is the source addresses of the corresponding errored IP packet. The destination address of a reply message is the source addresses of the corresponding request. The destination address of a request message is signaled by the upper layer to the ICMP block.

The TTL is not signaled, but it is set by the IP_T to the default value. The router advertisement messages are an exception: the TTL is set to 1.

The ToS field of error reporting and request ICMP messages should be set to the inter-network control message code (i.e. the "11000000" value). The ToS field for the reply ICMP messages should be set to the same value of the ToS field in the corresponding request.

If the packet that provoked the sending of the ICMP message contains a source routing option (either a strict or a loose one), the same type of option, with an hop list obtained by reversing the route up to the current point, should be signaled to IP_T block. The previous requirement is not satisfied when the ICMP message is generated because of an error in the source route option itself.

Destination unreachable messages are error reporting messages with type=3.

The unused bytes are set to 0 during transmission and ignored during reception.

Time exceeded messages are error reporting messages with type=11.

The unused bytes are set to 0 in transmission and ignored in reception.

Parameter problem messages are error reporting messages with type=12.

The unused bytes are set to 0 in transmission and ignored in reception.

Source Quench messages are error reporting messages with type=4.

Only code 0 is defined.

Redirect messages are error reporting messages with type=5.

Echo messages are request and reply messages with type=8 and type=0 respectively.

Only code=0 has been defined.

Timestamp messages are request and reply messages with type=13 and type=14 respectively.

Only code=0 has been defined.

Information messages are request and reply messages with type=15 and type=16 respectively.

Only code=0 has been defined.

Address mask messages are request and reply messages with type=17 and type=18 respectively.

Only code=0 has been defined.

Router solicitation and advertisement messages are request and reply messages with type=10 and type=9 respectively.

Only code=0 is defined.

In the above, basically two methods of processing packets (IP packets and/or MPLS packets) in a telecommunication equipment were described according to two specific embodiments of the present invention.

According to another aspect, the present invention also relates to a telecommunication equipment comprising means specifically adapted to carry out such or similar methods.

According to still another aspect, the present invention also relates to a computer program product comprising computer program code means adapted to perform all the steps of such or similar methods when said program is run on a computer.

According to a final aspect, the present invention also relates to a computer readable medium having a program recorded thereon, said computer readable medium comprising computer program code means adapted to perform all the steps of such or similar methods when said program is run on a computer.

The invention claimed is:

1. A method of processing IP packets at layer three level in a telecommunication equipment, the equipment comprising a first box containing layer 4 protocols, and a second box containing hardware interfaces and layer 2 drivers, the method comprising the following steps in the following order, which are performed by a first termination block:

in the incoming direction:
validating IP packets by performing checks,
managing options field by interpreting all the options that said first termination block understands and preserving unaltered all other options,
filtering,
deciding first next layer and forwarding;

in the outgoing direction:
managing redirect by checking if the packet that is going to be sent satisfies the following conditions:
the IP packet has been received from a same interface over which the IP packet is going out,
the source address belongs to a sub-network of a next-hop,
there is no source route option,
managing TTL by considering a valid packet any IP packet addressed to the equipment and with TTL equal to zero,
managing source address,
managing options field by interpreting all the options that said first termination block understands and preserving unaltered all other options,
fragmenting packets when the packet to be routed has a size greater than a Maximum Transmission Unit, wherein, in case of IP packets originated from or destined to the equipment, said method further comprising the following steps in the following order, which are performed by a second termination block in the incoming direction, after the first next layer decision and forwarding step:
validating the IP packets by performing checks,
reassembling incoming fragmented packets,
managing options field by interpreting all options that said second termination block understands,
deciding second next layer by stripping the header and forwarding the payload to the upper client layers using the protocol as selector;

in the outgoing direction, before the step of managing redirect:
multiplexing IP payloads coming from different upper layer protocols,
managing options field, and
generating IP headers.

2. Method according to claim 1, wherein, in case of IP packets to be emitted by the equipment, the following steps are performed by a connection block:
in the incoming direction, after the step of deciding first next layer and forwarding:
performing a first lookup step in order to decide the destination of the incoming packet,
in the outgoing direction, before the step of managing redirect and after the step of generating the IP header:
performing a second lookup step in order to decide the destination of the outgoing packet.

3. Method according to claim 2, wherein, in case of IP in IP tunneling, in the incoming direction, after the step of deciding first next layer and forwarding and before the first lookup step, comprises the following steps, which are performed by a tunnel termination block in the following order:

determining which headers must be stripped, stripping the tunnel headers, processing the TTL of the stripped headers with the exception of the first one already processed in a preceding step, processing the CRC of all the stripped headers with the exception of the first one already processed in a preceding step, and the following steps are performed by the first termination block:

validating the IP packets by performing checks, managing options field by interpreting all the options that said first termination block understands and preserving unaltered all the other options, filtering, deciding third next layer and forwarding;

in the outgoing direction, after the second lookup step and before the step of managing redirect, it further comprises the following steps, which are performed by the first termination block in the following order:

managing redirect by checking if the packet that is going to be sent satisfies the following conditions:

the IP packet has been received from a same interface over which the IP packet is going out, the source address belongs to a sub-network of a next-hop, there is no source route option, managing TTL by considering a valid packet any IP packet addressed to the equipment and with TTL equal to 0, managing source address, managing options field by interpreting all the options that said first termination block understands and preserving unaltered all other options, fragmenting said packet when the packet to be routed has a size greater than said Maximum Transmission Unit;

and the following steps performed by said tunnel termination block:

determining which tunnels must be created, validating IP address of the incoming packet versus tunnel addresses, making address translation from client receiver to tunnel endpoint address and vice versa, inserting of external header, processing the external header fields forcing the fragmentation flag to "do not fragment" value, processing the external header options field, calculating external header checksum, making path MTU recovery, in case errors occurred in transmission, sending ICMP messages to the originator of the messages being routed in the tunnel.

4. Method according to claim 3, further comprising the following steps which are performed by a MPLS box:

in the incoming direction, before the first IP packet validation step:

input processing MPLS packets, in the outgoing direction, after the second lookup step:

output processing an MPLS packet.

5. Method according to claim 2, further comprising the following steps which are performed by a MPLS box:

in the incoming direction, before the first IP packet validation step:

input processing MPLS packets, in the outgoing direction, after the second lookup step:

output processing an MPLS packet.

6. Method of processing MPLS packets at layer three level in a telecommunication equipment, the equipment comprising a first box containing layer 4 protocols, and a second box containing hardware interfaces and layer 2 drivers, the method comprising the following steps in the following order, which are performed by a MPLS box:

in the incoming direction:

counting received frames and number of octets through an incoming termination block of said MPLS box, validating MPLS packets against label range through said incoming termination block, determining an interface identification through said incoming termination block, counting received packets and number of octets through a first incoming adaptation block of said MPLS box, stripping an external MPLS header retrieving stripped information through said first incoming adaptation block, looking up for a destination of an incoming MPLS packet through a connection block of said MPLS box, deciding next layer based at least on End_of_Stack flag through a termination block of said MPLS box, forwarding to the next layer through said termination block, managing TTL through a second incoming adaptation block and through an adaptation block of said MPLS box, if next-hop is not the equipment itself, determining PHB through said second incoming adaptation block and through said adaptation block; in the outgoing direction:

extracting TTL from a received outgoing client packet through said adaptation block, passing on the received outgoing client packet as a stripped MPLS packet together with FEC, PHB, TTL through said adaptation block, generating an End_of_Stack bit through said termination block, passing on the stripped MPLS packet together with FEC, PHB, TTL and End_of_Stack through said termination block, looking up for the destination of outgoing client packets with FEC originated by the equipment through said connection block, managing TTL through an outgoing adaptation block of said MPLS box;

creating a new MPLS header and setting EXP bits according to said PHB through said outgoing adaptation block, counting transmitted packets and number of octets through said outgoing adaptation block, performing MPLS fragmentation and passing on MPLS packet, PHB, and Next Hop through an outgoing termination block of said MPLS box.

7. Method according to claim 6, wherein, in case of multiple MPLS encapsulation, in the incoming direction, the processing steps are repeated on stripped MPLS packet;

in the outgoing direction, all the MPLS labels required for multiple MPLS encapsulation are pushed during one MPLS header creation step.

8. Method according to claim 7, wherein, in case of penultimate hop, in the incoming direction, the client packet is forwarded to the lower layer, is stripped and emitted.

9. Method according to claim 6, wherein, in case of penultimate hop, in the incoming direction, the client packet is forwarded to the lower layer, is stripped and emitted.

10. Method according to claim 6, wherein the client packet is an IP packet.

11. Method according to claim 6, wherein the client packet is an Ethernet frame.

* * * * *